United States Patent [19]

Bakx

[11] Patent Number: 5,365,508
[45] Date of Patent: Nov. 15, 1994

[54] MAGNETO-OPTICAL READ/WRITE DEVICE

[75] Inventor: Johannus L Bakx, Eindhoven, Netherlands

[73] Assignee: U.S. Philips Corporation, New York, N.Y.

[21] Appl. No.: 154,133

[22] Filed: Nov. 18, 1993

[30] Foreign Application Priority Data

Nov. 20, 1992 [EP] European Pat. Off. ........ 92203586.0

[51] Int. Cl.$^5$ ............................................. G11B 11/12
[52] U.S. Cl. ................................. 369/124; 369/110; 369/13
[58] Field of Search ................. 369/124, 99, 122, 120, 369/13, 44.35, 47, 48, 60, 110

[56] References Cited

U.S. PATENT DOCUMENTS 4,837,758  6/1989  Motoyama et al. .................... 369/13
5,062,091  10/1991  Maeda et al. ......................... 369/59

FOREIGN PATENT DOCUMENTS 0189187  7/1986  European Pat. Off. .

Primary Examiner—Paul M. Dzierzynski
Assistant Examiner—Don Wong
Attorney, Agent, or Firm—Leroy Eason

[57] ABSTRACT

A magneto-optical read/write device having a radiation detection system which includes two radiation-sensitive detectors the outputs of which are connected via DC coupled current-to-voltage converters to an input of an adder circuit and an input of a subtracter circuit to obtain a sum signal and a difference signal. The sum signal on the output of the adder circuit is coupled to an input of a selection circuit via a capacitive coupling. The difference signal on the output of the subtracter circuit is coupled to another input of the selection circuit. The output of the selection circuit is coupled to a signal processing circuit via another capacitive coupling. The device is particularly suited for use with a magneto-optical record carrier having sector headers with a pre-arranged pit structure. When information areas between the sector headers are recorded and erased, the device maintains the intensity level at a constant read level during scanning of the sector headers and avoids production of undesired transition phenomena at the output of the selection circuit.

2 Claims, 1 Drawing Sheet

MAGNETO-OPTICAL READ/WRITE DEVICE

BACKGROUND OF THE INVENTION

1. Field of the Invention

The invention relates to a magneto-optical read/write device for reading and writing information by magneto-optical means on a magneto-optical record carrier, the device comprising a magneto-optical read/write head which includes a radiation source for generating a radiation beam, and an optical system for focusing the radiation beam on a magneto-optical detection system via the record carrier. The Detection includes a first and a second radiation-sensitive detector, an output of the first detector being coupled to a first input of an adder circuit and a first input of a subtracter circuit, and an output of the second detector being coupled to a second input of the adder circuit and a second input of the subtracter circuit. The output of the adder circuit is coupled to a first input of a selection circuit, the output of the subtracter circuit is coupled to a second input of the selection circuit, and the output of the selection circuit is coupled to a signal processing circuit.

2. Description of the Related Art

A device of this type is known, for example, from U.S. Pat. No. 4,833,662, and device is intended to be used in combination with magneto-optical record carriers whose tracks are subdivided into sectors in which are areas preceded by sector headers in the form of pre-arranged pit structures.

Such pit structures produce intensity modulation in the radiation beam. The sector header information may be recovered on the basis of the output signal of the adder circuit. The information in the areas is recorded in the form of magnetic domains. The information represented by these domains can be recovered from the output signal of the subtracter circuit. Depending on the scanned type of domain structure the selection circuit passes on either the output signal of the subtracter circuit or the output signal of the adder circuit to the signal processing circuit.

The detection signals produced by the detectors have a large DC component. This means that the sum of the detection signals also has a large DC component, whereas the difference between the detection signals has a much smaller DC component. Since both the sum of detection signals and the difference between the detection signals are to be processed by the same signal processing circuit, it is important that the DC component at the output of the selection circuit should not depend on the particular signal.

In prior art magneto-optical device this is achieved by coupling the output of the detectors to the inputs of the adder circuit and subtracter circuit by an AC coupling. The adder circuit and the subtracter circuit are then exclusively supplied with signals free from DC current, due to which the DC components on the output of the subtracter circuit and on the output of the adder circuit are equal.

Such solution, however, causes problems when information is recorded and erased. During recording, the intensity of the radiation beam is switched between a high write level and a low read level in accordance with the information to be recorded. During scanning of the sector headers, the intensity of the radiation beam is constantly maintained at the read level. This means that the mean intensity of the radiation beam during the writing is higher than the mean intensity of the radiation beam during the scanning of the sector headers. Such a variation of the DC level is also found during erasure, whereas the intensity of the radiation beam when the sector headers are scanned is equal to the read level, and the intensity when areas between the sector headers are scanned is set to a high write level. The differences between the mean intensities of the radiation beam lead to the fact that the DC level of the detection signals during recording or erasure is higher than when the sector headers are scanned. When a change is made from information recording to sector header reading, a jump-like change occurs in the detection signals.

When AC coupling between the detectors and the adder circuit is applied, this means that the output signal of the adder circuit presents an exponential transition phenomenon on which the detection signal proper is superposed. For, the voltage across the AC couplings will change at a rate determined by the time constant of the coupling. Such a detection signal superposed on an exponential transition phenomenon causes problems with the information recovery. On the one hand, the use of very small time constants is undesired because this leads to detection problems when coded signals not free from DC current are read, such as, for example, the frequently used (2,7) code. Large time constants are also undesired because of their attendant long duration of the transition phenomenon. The problem of transition phenomena occurring in recording devices may be eliminated by utilizing what is commonly referred to as squelch circuits which short-circuit the signal for a brief period of time. However, this always leads to compromises as regards the performance of the device.

SUMMARY OF THE INVENTION

It is an object of the invention to provide a magneto-optical read/write device, in which the output signal of the adder circuit and that of the subtracter circuit can alternately be processed by a signal processing circuit, and in which the change of the DC level of the detection signals when writing or erasing is changed to reading causes the transitional phenomena in the signals that are to be processed by the signal processing circuit to diminish.

This object is achieved by a device as described in the opening paragraph, characterized in that the couplings of first and second detectors to the adder and subtracter circuits are DC couplings, and in that the couplings of the outputs of the adder and subtracter circuits to the selector circuit are capacitive couplings.

The voltage across the capacitive couplings is equal to the DC level of the selected signal presented to the signal processing circuit through this coupling. The moment the coupling is interrupted, the voltage across this coupling is maintained. The moment the coupling is restored, the voltage across this capacitive coupling then already has the right value and, consequently, no transition phenomena occur in the signal to be processed by the signal processing circuit.

A further embodiment of the device is characterized in that the signal processing circuit comprises an input stage which forms, in combination with the capacitive coupling, a high-pass filter.

This embodiment is advantageous in that the filter for filtering the signals to be processed is obtained in an extremely simple manner. In the case where the recorded signals are not free from DC current, such a filtering is desired for obtaining a reliable signal recovery. For that matter, such a filtering may cause the low-frequency component in the processor input signal, which component does have a disturbing effect on the signal recovery, to be suppressed in the processor input signal.

BRIEF DESCRIPTION OF THE DRAWINGS

The invention will be further explained with reference to the drawing FIGS. 1 and 2, in which.

DESCRIPTION OF THE PREFERRED EMBODIMENTS

Figure 1:
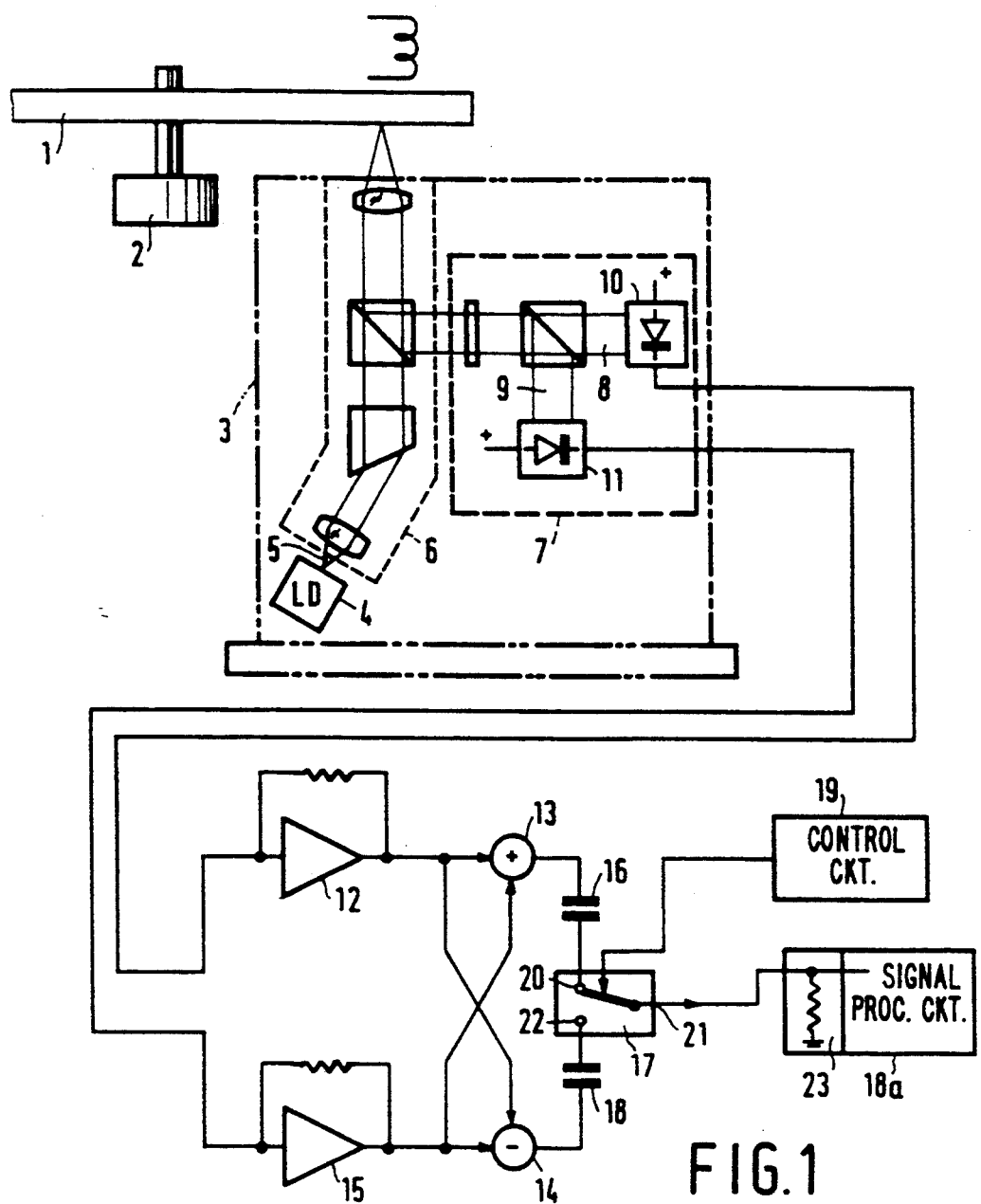
FIG. 1 shows an embodiment of the read/write device according to the invention.

FIG. 1 shows an embodiment of a magneto-optical read/write device according to the invention. Reference character 1 is used to denote a disc-shaped magneto-optical record carrier. The record carrier 1 is of a customary type in which the tracks are subdivided into sectors which are areas preceded by a sector header which is formed by a prearranged structure of pits. This pit structure represents control information which comprises, for example, synchronisation and address information. The areas between the sector headers are intended for recording information in the form of structures of magnetic domains having different directions of magnetization. These areas will be referenced information areas hereinafter. For a detailed description of the record carrier of said type reference be made, for example, to EP 0,420,591.

The record carrier 1 is rotatingly driven by a drive motor 2. Opposite to the rotating record carrier 1 is a magnetic read/write head 3 of a customary type. The head 3 comprises a radiation source, for example, formed by a semiconductor laser 4 which generates a radiation beam 5. The radiation beam 5 is led to a magneto-optical detection system 7 by an optical system 6 of a customary type via the record carrier 1. The magneto-optical detection system 7 is a system of a customary type splitting up the received radiation beam into two sub-beams 8 and 9 which have two mutually perpendicular directions of polarization. The sub-beams 8 and 9 are lead to a first and a second radiation-sensitive detector 10 and 11 respectively. The detectors 10 and 11 are of a customary type producing a detection signal which is indicative of the power of the received radiation. Generally, a photodiode producing a detection current proportional to the received radiation power is used for the detectors 10 and 11.

The difference between the detection currents produced by the detectors 10 and 11 is indicative of the magnetization of the record carrier 1 at the focal point of the radiation beam 5. The sum of the detection currents is indicative of the intensity of the radiation beam reflected by the record carrier 1. The information in the sector headers can be recovered on the basis of the sum of detection currents, whereas the recorded information in the information zones between the sector headers can be recovered on the basis of the difference between the detection currents. For a detailed description of the optical system, the magneto-optical head and the underlying detection principles for the detection of information in the sector headers and the recorded information in the information zones, reference be made to EP-A 0,420,591, U.S. Pat. Nos. 4,833,662 and 4,837,758 which documents are deemed incorporated herein by reference. The detection current produced by the detector 10 is converted to a signal voltage by a DC coupled current-to-voltage converter 12, which signal voltage is applied to an input of an adder circuit 13. This signal voltage is further applied to an input of a subtracter circuit 14.

The detection current produced by the detector 11 is converted by a DC coupled current-to-voltage converter 15 to a signal voltage applied to a second input of the adder circuit 13 and to a second input of the subtracter circuit 14. The output signal of the adder circuit is applied to an input 20 of a selection circuit 17 via a capacitive coupling 16. The output signal of the subtracter circuit is applied to a second input 22 of the selection circuit 17 via a capacitive coupling 18. An output 21 of the selection circuit 17 is coupled to an input stage 23 of a signal processing circuit 18a of a customary type to recover the information recorded in the scanned areas of the record carrier. For a detailed description of a possible embodiment of the processing circuit 18a reference be made to said patent application EP-A 0,420,591. The selection circuit 17 is of a customary type which couples either one of the two inputs 20 or 22 to the output 21 in response to the control signal received from a control circuit 19. The control circuit 19 is also of a customary type controlling the selection in such a way that during the time intervals in which the sector headers are scanned, the input 20 is coupled to the output 21 and, simultaneously, the input 22 is uncoupled from the output 21. During the time intervals in which the information areas between the sector headers are scanned, the input 22 is coupled to the output 21 and the input 20 is uncoupled from the output 21. For a detailed description of an embodiment of the control circuit 19 reference be again made to EP-A 0,420,591.

The detection currents produced by the detectors 10 and 11 both present a large DC component which results in the fact that the sum signal on the output of the adder circuit 13 likewise presents a large DC component. In contrast, the DC component of the difference signal on the output of the subtracter circuit 14 is small. During the time intervals in which the sector headers are scanned, the voltage across the capacitive coupling adjusts itself to a value equal to the DC component in the sum signal on the output of the adder circuit 13. When the scanning of the sector headers has been terminated, the input 20 of the selection circuit 17 is uncoupled from the output 21. This means that the voltage across the capacitive coupling 16 is maintained at its most recently adopted value, until the moment when the next sector header is scanned and the input 20 is coupled to the output 21 again. Because the voltage across the capacitive coupling 16 is maintained when the input 20 is uncoupled from the output 21, this voltage will already have the right value when the coupling is restored and, consequently, there will be no transition phenomenon. Similarly, the voltage across the capacitive coupling 18, which voltage corresponds to the DC component in the difference signal when the information areas between the sector headers are scanned, is maintained.

Figure 2:
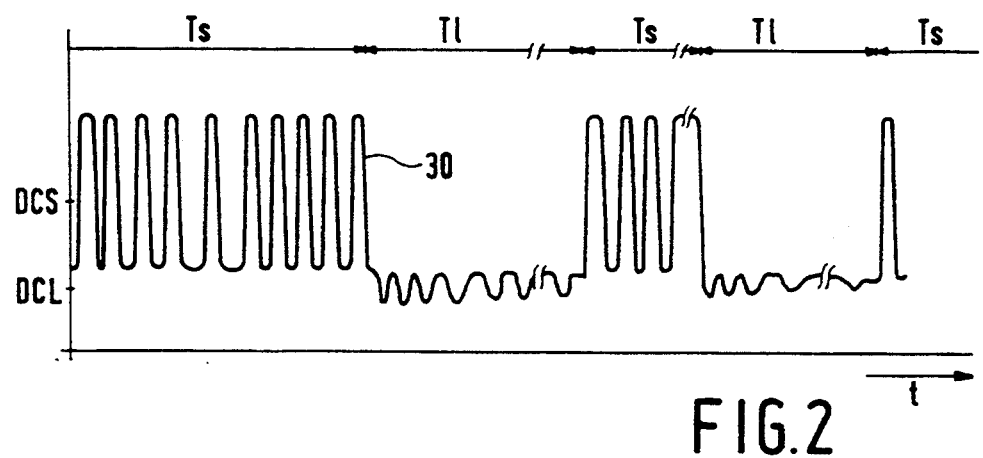
FIG. 2 shows a detection signal in explanation of the operation of the device.

When information is recorded in the information areas, the intensity of the radiation source 4 is switched between a low read level and a high write level when these information areas are scanned, whereas the intensity is maintained at the low read level when the sector headers are scanned. This means that the DC level in the detection currents produced by the detectors 10 and 11 when the sector headers are scanned differs from the DC level in the detection signals when the information areas are scanned. FIG. 2 shows by way of illustration the detection current of one of the detectors 10 or 11 as it is when information is recorded as a function of time t represented by a curve 30. Time intervals in which a sector header is scanned with a radiation beam set to the read level are referenced T1. The time intervals in which the information areas between the sector headers are scanned with an intensity alternating between read level and write level are referenced Ts. The DC level in the time intervals Ts is equal to DCS. In the time intervals T1 the DC level is equal to DCL, which level is considerably lower than the DCS level.

These variations of the DC level, however, do not have an effect on the voltages across the capacitive couplings 16 and 18. For, the voltage across the capacitive coupling 16 is exclusively determined by the detection signals in the time intervals T1 and the voltage across the capacitive coupling 18 is exclusively determined by the detection currents in the time intervals Ts.

When information is erased from the areas between the sector headers, the intensity of the radiation beam is set to either a constant, high write level or to an intensity periodically alternating between the low read level and the high write level. Even in that case the DC level in the detection currents during the scanning of the sector headers will differ from the DC level during the scanning of the information areas between the sector headers. For reasons already described hereinbefore, the variation of the DC level does not affect the voltage across the capacitive couplings.

In the case where the recorded information is not coded in a DC-free code, such as, for example, the (2,7) code, it is desired that the signal to be processed by the signal processing circuit 18a is first filtered by a high-pass filter to avoid the available low-frequency component disturbing the signal recovery process. Such a filter may be simply realized by arranging the input stage 23 of the signal processing circuit 18a in such a way that this stage forms a high-pass filter in combination with the capacitive coupling. In its most simple embodiment the input stage 23 comprises a resistor inserted between the input of the processing circuit 18a and a point of constant potential.

I claim:

1. Magneto-optical read/write device for reading and writing by magneto-optical means information from/on a magneto-optical record carrier, the device comprising a magneto-optical read/write head which includes a radiation source for generating a radiation beam, and an optical system for focusing the radiation beam on a magneto-optical detection system via the record carrier; said detection system comprising a first and a second radiation-sensitive detector, an output of the first detector being coupled to a first input of an adder circuit and a first input of a subtracter circuit, an output of the second detector being coupled to a second input of the adder circuit and a second input of the subtracter circuit, an output of the adder circuit being coupled to a first input of a selection circuit, an output of the subtracter circuit being coupled to a second input of the selection circuit, the output of the selection circuit being coupled to a signal processing circuit; characterized in that the couplings of the first and second detectors to the adder and subtracter circuits are DC couplings, and the couplings of the outputs of the adder and subtracter circuits to the selector circuit are capacitive couplings.

2. Device as claimed in claim 1, characterized in that the signal processing circuit comprises an input stage which forms, in combination with the capacitive couplings a high-pass filter.

* * * * *